United States Patent [19]

Kobayashi

[11] Patent Number: 4,469,751

[45] Date of Patent: Sep. 4, 1984

[54] MAGNETIC RECORDING MEDIA COMPRISING SPECIFIC TYPES OF SILICONE LUBRICANTS IN THE MAGNETIC LAYER THEREOF

[75] Inventor: Osamu Kobayashi, Mito, Japan

[73] Assignee: Victor Company of Japan, Limited, Yokohama, Japan

[21] Appl. No.: 534,114

[22] Filed: Sep. 20, 1983

[30] Foreign Application Priority Data

Sep. 21, 1982 [JP] Japan .................. 57-163100
Sep. 21, 1982 [JP] Japan .................. 57-163101

[51] Int. Cl.³ .................... G11B 5/68; G11B 5/72
[52] U.S. Cl. .................... 428/447; 252/62.54; 427/128; 360/134; 360/135; 360/136; 428/480; 428/694; 428/695; 428/900
[58] Field of Search ........... 428/694, 695, 900, 447, 428/480; 427/128; 252/62.54; 360/134-135

[56] References Cited

U.S. PATENT DOCUMENTS

| | | | |
|---|---|---|---|
| 4,007,313 | 2/1977 | Higuchi | 428/900 |
| 4,007,314 | 2/1977 | Higuchi | 428/900 |
| 4,131,717 | 12/1978 | Hirano | 428/900 |
| 4,369,230 | 1/1983 | Kimura | 428/900 |
| 4,431,703 | 2/1984 | Somezawa | 428/900 |

FOREIGN PATENT DOCUMENTS

52-34924 9/1977 Japan .
57-92424 6/1982 Japan .

*Primary Examiner*—Ellis P. Robinson
*Attorney, Agent, or Firm*—Lowe, King, Price & Becker

[57] ABSTRACT

Magnetic recording media having specific types of lubricants contained in the magnetic layer, the lubricants comprising at least one compound selected from the group consisting of silicone compounds of the formulas (I) and (II)

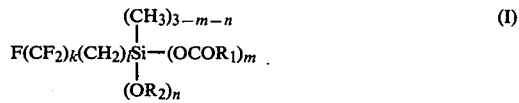

in which $R_1$ represents a saturated or unsaturated monovalent hydrocarbon group having from 7 to 21 carbon atoms, $R_2$ represents a saturated monovalent hydrocarbon group having from 1 to 4 carbon atoms, k is an integer of from 1 to 12, l is an integer of from 2 to 6, m is an integer of 1 or 2, and n is an integer of 1 or 2 provided that $m+n \leq 3$, and

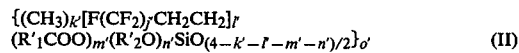

in which $R'_1$ represents a saturated or unsaturated monovalent hydrocarbon group having from 7 to 21 carbon atoms, $R'_2$ represents a saturated monovalent hydrocarbon group having from 1 to 4 carbon atoms, j' is an integer of from 1 to 12, $0 \leq k' < 2$, $0 < m' < 2.5$, $0 < l' \leq 1$, $0 < n' \leq 2$, $2 \leq k'+l'+m'+n' \leq 3$, and o' is an integer of from 2 to 300 and satisfies the requirement that when multiplied by o', the values k', l', m' and n', respectively, give an integer.

6 Claims, No Drawings

MAGNETIC RECORDING MEDIA COMPRISING SPECIFIC TYPES OF SILICONE LUBRICANTS IN THE MAGNETIC LAYER THEREOF

BACKGROUND OF THE INVENTION

1. Field of the Invention

This invention relates to the magnetic recording art and more particularly, to magnetic recording media which comprise specific types of lubricants contained in the magnetic layer thereof.

2. Description of the Prior Art

Small-size, portable home video tape recorders have been recently developed and reduced into practice. This type of video tape recorder is frequently employed for recording of outdoor activities. This in turn requires magnetic recording media which are proof against severe environmental conditions. For instance, they should stand use over a wide range of temperature. One of properties of magnetic recording media which are readily affected by a change of temperature is a travelling performance. The magnetic layer considerably increases in coefficient of kinetic friction especially under low temperature conditions, so that the travelling performance becomes poorer.

In order to solve frictional problems involved in magnetic recording media, it is common to add lubricants to the magnetic layer of the media. Typical examples of the lubricants include higher fatty acids, dimethyl silicone, and the like.

Although higher fatty acids exhibit good compatibility with binder resins in magnetic layer and show relatively good lubricating effects, they are apt to be adsorbed on magnetic particles. This leads to drawbacks that the acids are unlikely to ooze on the magnetic layer surface, thus reducing the effect of lowering the coefficient of kinetic friction of the magnetic layer surface and tending to give an adverse influence of temperatures on the layer.

Dimethyl silicone shows the great lubricating effect of the magnetic layer but has poor compatibility with resin components in the layer, leading to ready exudation of the silicone from the magnetic layer surface. When the magnetic recording medium having the magnetic layer on which the dimethyl silicone exudes is repeatedly used, its coefficient of kinetic friction gradually increases. As a result, the travelling performance and abrasion resistance undesirably lower. The exuded dimethyl silicone will cause magnetic heads and the like parts to be stained therewith, giving an adverse influence on recording and reproducing operations.

As substitutes for these higher fatty acids and dimethyl silicone, there have been proposed in Japanese Patent Publication No. 52-34924 and Japanese Laid-open Patent Application No. 57-92424 silicone compounds represented by the following formulas (A) and (B), respectively.

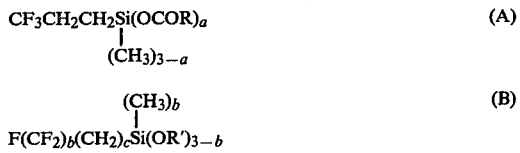

Although these silicone compounds have an excellent lubricating effect and a coefficient of friction stabilized against the temperature change, they are not satisfactory in compatibility with resin components in magnetic layer.

SUMMARY OF THE INVENTION

An object of the present invention is to provide magnetic recording media comprising specific types of silicone compounds excellent as a lubricant in the magnetic layer, which compounds have good compatibility with binder resins in the magnetic layer without lowering magnetic characteristics of the media.

Another object of the invention is to provide magnetic recording media which have stable travelling performance and no head-clogging problem over a wide range of temperature because of the presence of specific types of silicone compounds in the magnetic layer of the media.

The above objects can be achieved, according to the invention, by a magnetic recording medium which comprises a support and a magnetic layer formed on at least one side of the support and made of magnetic particles dispersed in a mixture of a binder and a lubricant, the lubricant comprising a compound selected from the group consisting of silicone compounds of the following formulas (I) and (II)

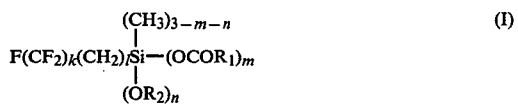

in which $R_1$ represents a saturated or unsaturated monovalent hydrocarbon group having from 7 to 21 carbon atoms, $R_2$ represents a saturated monovalent hydrocarbon group having from 1 to 4 carbon atoms, k is an integer of from 1 to 12, l is an integer of from 2 to 6, m is an integer of 1 or 2, and n is an integer of 1 or 2 provided that $m+n \leq 3$, and

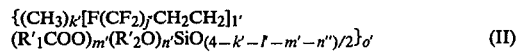

in which $R'_1$ represents a saturated or unsaturated monovalent hydrocarbon group having from 7 to 21 carbon atoms, $R'_2$ represents a saturated monovalent hydrocarbon group having from 1 to 4 carbon atoms, j' is an integer of from 1 to 12, $0 \leq k' < 2$, $0 < m' < 2.5$, $0 < l' \leq 1$, $0 < n' \leq 2$, $2 \leq k'+l'+m'+n' \leq 3$, and o' is an integer of from 2 to 300 and satisfies the requirement that when multiplied by o', the values k', l', m' and n', respectively, give an integer.

DETAILED DESCRIPTION AND PREFERRED EMBODIMENTS OF THE INVENTION

When incorporated in the magnetic layer, the silicone compounds of the formulas (I) and (II) are more durable and more unlikely to contaminate magnetic heads of recording and reproducing apparatus therewith than the known silicone compounds of the formulas (A) and (B). Because these silicone compounds have fluorinated hydrocarbon groups in the molecule thereof, they have not only an excellent lubricating effect, but also good thermal stability.

In general, these silicone compounds are used in an amount ranging from about 0.1 to 15 wt% based on magnetic powder contained in the magnetic layer. Smaller amounts do not produce a significant effect, whereas larger amounts will cause magnetic heads to be undesirably stained and the magnetic layer to be plasticized in excess. These compounds of the formulas (I) and (II) may be used singly or in combination.

In the formula (I), when the number of carbon atoms in $R_1$ is less than 7, the resulting compounds are unsatisfactory from the standpoint of the coefficient of friction and the durability. On the contrary, compounds of the formula (I) in which carbon atoms in $R_1$ are over 21 in number become poor in compatibility with binder resin in the magnetic layer, with the tendency that magnetic heads are apt to be stained with the compounds. Typical examples of the monovalent hydrocarbon groups will be particularly seen in examples described hereinafter.

If carbon atoms in $R_2$ of the formula (I) exceed 4, the resulting compounds lower in affinity for magnetic particles and binder resins in the magnetic layer. This results in lowering of durability of the magnetic layer and tends to cause magnetic heads to be contaminated. In particular, $R_2$ represents a methyl, ethyl, propyl or butyl group. k, l, m and n are integers defined before, respectively. Especially, when k exceeds 12, the resulting compounds become poor in compatibility with binder resins.

In the formula (II), $R'_1$ and $R'_2$ are determined as defined before for similar reasons as discussed with regard to $R_1$ and $R_2$ of the formula (I), respectively.

When $k' \leq 2$, the contents of the groups of $[F(CF_2)_j CH_2 CH_2]$ and $(R'_1 COO)$ undesirably lower relative to the $(CH_3)$ group because of the requirement that $2 \leq k' + l' + m' + n' \leq 3$, so that the resultant compounds become unsatisfactory in lubricating property. When $l'$ exceeds 1, the compatibility with binder resins lowers. Likewise, when $m' \geq 2.5$, the relative contents of $[F(CF_2)_j CH_2 CH_2]$ and $(R_2 O)$ lower, so that the problem of durability encounters. The value, $n'$, larger than 2 leads to the relative lowering in content of the groups, $[F(CF_2)_j CH_2 CH_2]$ and $(R'_1 COO)$, with the result of the unsatisfactory lubricating property. $o'$ should be an integer ranging from 2 to 300 but cannot necessarily take any values in this range. This is because when multiplied by $o'$, all the values, $k'$, $m'$, $l'$ and $n'$ must be integers. When $o'$ exceeds 300, the resulting compounds have poor compatibility with binder resin.

The silicone compounds of the formulas (I) and (II) are prepared as follows.

The silicone compounds of the formula (I) are prepared by the following procedure. A chlorosilane compound of the formula,

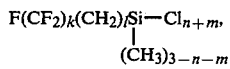

in which k, l, m and n have the same meanings as defined before, respectively, a carboxylic acid of the formula, $R_1COOH$, in which $R_1$ represents the same meaning as defined before, and an alcohol of the formula, $R_2OH$, in which $R_2$ has the same meaning as defined before, are interacted in the presence of a deacidification agent. Examples of the agent include tertiary amines such as trimethylamine, pyridine and the like.

Similarly, the compounds of the formula (II) are prepared by the following procedure.

An organochlorosilane of the formula,

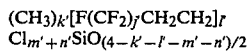

in which j', k', l', m' and n' have the same meanings as defined before, respectively, a carboxylic acid of the formula, $R'_1COOH$ in which $R'_1$ has the same meaning as defined before, and an alcohol of the formula, $R'_2OH$ in which $R'_2$ has the same meaning as defined before are interacted in the presence of a deacidification agent. The same type of agent as used for the preparation of the compounds of the formula (I) are likewise used. These procedures are usually effected in solvent. Examples of the solvent are aromatic hydrocarbons such as toluene, xylene and the like, ethers such as diethyl ether, dibutyl ether and the like, and tetrahydrofuran.

The compounds of the formula (II) may take linear, branched or circular molecular structures and all the types of compounds may be likewise used as the lubricant in the practice of the invention.

Ingredients other than the silicone lubricant contained in the magnetic layer are not limited to any specific materials.

Known binders and magnetic materials for these purposes are used. Examples of the magnetic materials include ferromagnetic iron oxide materials such as gamma-$Fe_2O_3$ and $Fe_3O_4$ with or without additional metals such as Co, Ni, Mn, and the like, ferromagnetic metals such as Fe, Co, Ni, and alloys thereof such as Fe-Co, F-Ni, Co-Ni, and Fe-Co-Ni with or without other metals such as Al, Cr, Mn, Cu, Zn, and the like.

Useful binders are any known thermoplastic resins, thermosetting resins, and mixtures thereof. Typical of the thermoplastic resins are vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate-vinyl alcohol terpolymers, and various other synthetic resins. Examples of the thermosetting resins include phenolic resins, melamine resins, alkyd resins, silicone resins, urea-formaldehyde resins, mixtures of isocyanates and polyols, and the like. These binder resins may be used singly or in combination. Typical solvents for these binders are aromatic compounds such as xylene, toluene, benzene, and the like, ketones such as methyl ethyl ketone, methyl isobutyl ketone, cyclohexanone, tetrahydrofuran and the like, and mixtures thereof. Broadly, magnetic particles are used in an amount of 200 to 800 parts by weight per 100 parts by weight of a binder, which may, more or less, vary depending on the type of recording medium as is well known in the art.

In fabricating the magnetic recording medium of the present invention, binder resins, magnetic particles, and an silicone compound of the formula (I) or (II) are mixed in predetermined ratios in solvent and kneaded in a suitable kneading machine such as a three roll mixer, ball mill, sand grinder, kneader, or the like. The resulting magnetic paint is passed through a filter to remove foreign matters therefrom and applied to a base on at least one side thereof, followed by drying, calendering and curing as usual, thereby obtaining a magnetic recording medium. The base may be in the form of films, foils, or sheets made of a variety of materials such as synthetic or semi-synthetic resins, metals, and glasses or ceramics. As a matter of course, known additives may be added at the stage of the kneading, including dispersing agents, other lubricants, abrasive agents, anti-static agents, and the like. Provided that the lubricants of the present invention are contained in amounts defined before, other types of lubricants may also be contained in the magnetic layer of recording media of the invention, if required.

The recording media of the invention include video tapes, audio tapes, magnetic cards, magnetic discs, and the like.

The present invention is particularly described by way of examples.

EXAMPLE 1

About 100 parts by weight of Co-containing gamma-$Fe_2O_3$, about 19 parts by weight of a mixture of vinyl chloride-vinyl acetate-vinyl acetate terpolymer and polyurethane elastomer, about 5 parts by weight of carbon black, about 1 part by weight of soybean lecithin, about 270 parts by weight of a mixed solvent of methyl ethyl ketone, methyl isobutyl ketone and toluene, and below about 15 parts by weight, e.g. 2 parts by weight, of a silicone compound represented by the formula

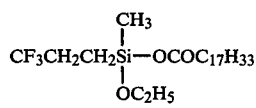

were mixed and dispersed for about 20 hours. Thereafter, the mixture was admixed with about 8 parts by weight of a polyisocyanate (D-103H, Takeda Pharm. Ind. Co., Ltd.). The resulting magnetic paint was applied onto a polyester film, dried and calendered as usual, followed by heating at about 55° C. for about 24 hours and slitting the film into tapes of a predetermined width for use in video tape recorders.

EXAMPLES 2 THROUGH 8

The general procedure of Example 1 was repeated using silicone compounds of the following formulas (2) through (8), respectively, thereby obtaining magnetic tapes.

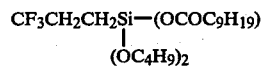

(2)

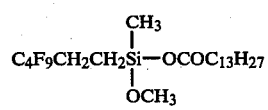

(3)

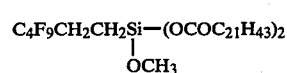

(4)

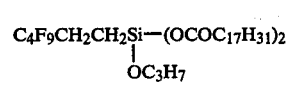

(5)

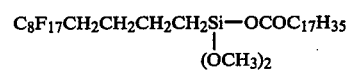

(6)

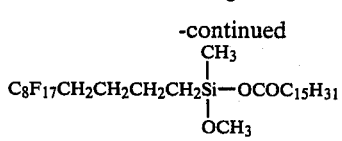

(7)

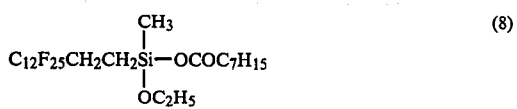

(8)

EXAMPLES 9 THROUGH 14

The general procedure of Example 1 was repeated using silicone compounds of the following formulas (9) through (14), respectively, thereby obtaining magnetic tapes.

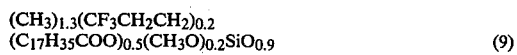

(9)

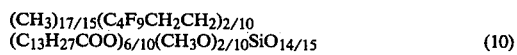

(10)

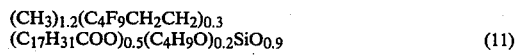

(11)

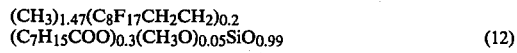

(12)

(13)

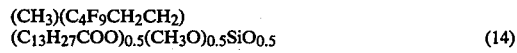

(14)

COMPARATIVE EXAMPLE 1

The general procedure of Example 1 was repeated using, instead of the silicone compound of Example 1, butyl stearate, thereby obtaining magnetic tapes.

COMPARATIVE EXAMPLES 2 AND 3

The general procedure of Example 1 was repeated using silicone compounds of the following formulas (1') and (2'), thereby obtaining magnetic tapes.

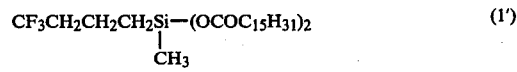

(1')

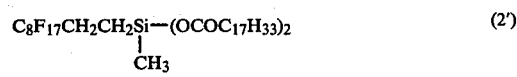

(2')

The magnetic tapes obtained in Examples 1 through 14 and Comparative Examples 1 through 3 were set in a magnetic recording and reproducing apparatus under conditions of a temperature of 60° C. and a relative humidity of 90% and each tape was subjected to a travelling test in which 400 travelling cycles were repeated. Furthermore, a coefficient of kinetic friction of each tape was measured at different temperatures. The result are shown in Table below.

TABLE

| | Coefficient of Kinetic Friction ($\mu_k$) | | | Travelling Test | | |
|---|---|---|---|---|---|---|
| | 0° C. | 20° C. 60 R.H. | 40° C. 80 R.H. | $\mu_k$ after completion of the Test | Deterioration of S— to —N Ratio (dB) | Degree of Head Contamination |
| Ex. | | | | | | |
| 1 | 0.24 | 0.23 | 0.21 | 0.30 | −0.5 | B |

TABLE-continued

| | Coefficient of Kinetic Friction ($\mu_k$) | | | Travelling Test | | |
|---|---|---|---|---|---|---|
| | 0° C. | 20° C. 60 R.H. | 40° C. 80 R.H. | $\mu_k$ after completion of the Test | Deterioration of S— to —N Ratio (dB) | Degree of Head Contamination |
| 2 | 0.23 | 0.19 | 0.19 | 0.28 | −0.2 | A |
| 3 | 0.25 | 0.23 | 0.21 | 0.29 | −0.1 | A |
| 4 | 0.24 | 0.22 | 0.20 | 0.27 | −0.6 | B |
| 5 | 0.20 | 0.20 | 0.18 | 0.29 | −0.2 | A |
| 6 | 0.24 | 0.24 | 0.22 | 0.30 | −0.6 | B |
| 7 | 0.20 | 0.19 | 0.19 | 0.28 | −0.5 | B |
| 8 | 0.22 | 0.21 | 0.19 | 0.27 | −0.2 | A |
| 9 | 0.20 | 0.19 | 0.18 | 0.27 | −0.4 | B |
| 10 | 0.25 | 0.24 | 0.20 | 0.30 | −0.5 | B |
| 11 | 0.21 | 0.21 | 0.18 | 0.28 | −0.1 | A |
| 12 | 0.21 | 0.22 | 0.18 | 0.28 | −0.1 | A |
| 13 | 0.24 | 0.24 | 0.20 | 0.30 | −0.4 | B |
| 14 | 0.23 | 0.22 | 0.19 | 0.29 | −0.2 | A |
| Comp. Ex. | | | | | | |
| 1 | 0.41 | 0.39 | 0.39 | 0.46 | −0.3 | B |
| 2 | 0.27 | 0.24 | 0.22 | 0.32 | −2.0 | D |
| 3 | 0.26 | 0.25 | 0.23 | 0.33 | −2.2 | D |

Note (1)
The deterioration of S— to —N ratio is expressed by a difference between the S— to —N ratio before the test and the ratio after the test.

Note (2)
The degree of head contamination is evaluated in four ranks by microscopically observing the magnetic head after the travelling test, in which A represents a very small degree of contamination B represents a small degree of contamination C represents a fair degree of contamination and d represents a very considerable degree of contamination not only on magnetic heads but also on the associated drums.

As will be seen from the results of the table, the magnetic tape of Comparative Example 1 is relatively small in the degree of head contamination and the deterioration of the S-to-N ratio but has so large a coefficient of kinetic friction that the travelling performance becomes poor. With the tapes of Comparative Examples 2 and 3, the coefficient of kinetic friction is relatively small and thus the stable travelling performance is obtained. However, the degree of head contamination is very considerable with a large deterioration of the S-to-N ratio.

In contrast, the magnetic tapes of Examples 1 through 14 of the present invention are small in the degree of head contamination and also in the deterioration of the ratio. Moreover, the coefficient of kinetic friction is so low that the travelling stability is ensured. Especially, when these tapes are placed over a long time under severe environmental conditions of 60° C. and 90 R.H.%, their travelling stability is excellent without involving the problem of head contamination.

What is claimed is:

1. A magnetic recording medium which comprises a support and a magnetic layer formed on at least one side of the support and made of magnetic particles dispersed in a mixture of a binder and a lubricant, the lubricant comprising at least one compound selected from the group consisting of silicone compounds of the following formulas (I) and (II)

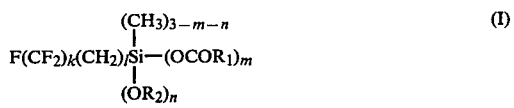

(I)

in which $R_1$ represents a saturated or unsaturated monovalent hydrocarbon group having from 7 to 21 carbon atoms, $R_2$ represents a saturated monovalent hydrocarbon group having from 1 to 4 carbon atoms, k is an integer of from 1 to 12, l is an integer of from 2 to 6, m is an integer of 1 or 2, and n is an integer of 1 or 2 provided that m+n≦3, and

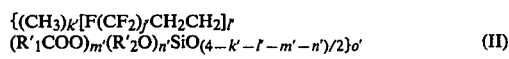

(II)

in which $R'_1$ represents a saturated or unsaturated monovalent hydrocarbon group having from 7 to 21 carbon atoms, $R'_2$ represents a saturated monovalent hydrocarbon group having from 1 to 4 carbon atoms, j' is an integer of from 1 to 12, 0≦k'<2, 0<m'<2.5, 0<l'≦1, 0<n'≦2, 2≦k'+l'+m'+n'≦3, and o' is an integer of from 2 to 300 and satisfies the requirement that when multiplied by o', the values k', l', m' and n', respectively, give an integer.

2. A magnetic recording medium according to claim 1, wherein said at least one silicone compound is contained in an amount of from 0.1 to 15 wt% of said magnetic particles.

3. A magnetic recording medium according to claim 1, wherein said lubricant essentially consists of said at least one compound.

4. A magnetic recording medium according to claim 1, wherein said lubricant is the silicone compound of the formula (I).

5. A magnetic recording medium according to claim 1, wherein said lubricant is the silicone compound of the formula (II).

6. A magnetic recording medium according to claim 1, wherein said lubricant is a mixture of the silicone compounds of the formulas (I) and (II).

* * * * *